(12) United States Patent
Vinberg et al.

(10) Patent No.: US 7,634,486 B2
(45) Date of Patent: Dec. 15, 2009

(54) SYSTEMS MANAGEMENT NAVIGATION AND FOCUS COLLECTION

(75) Inventors: Anders B. Vinberg, Kirkland, WA (US); Steven Karl Abrahams, Seattle, WA (US); Andrew Timothy Hopper, Bellevue, WA (US); Dustin Michael Ingalls, Sammamish, WA (US); Marisol Ontaneda, Redmond, WA (US); Benjamin S. Srour, Seattle, WA (US); Travis Dustin Sweat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 11/427,739

(22) Filed: Jun. 29, 2006

(65) Prior Publication Data

US 2008/0005292 A1    Jan. 3, 2008

(51) Int. Cl.
*G06F 17/30* (2006.01)
*G06F 7/00* (2006.01)
(52) U.S. Cl. .......................... 707/101; 707/4; 707/102
(58) Field of Classification Search ................ 707/3, 707/4, 5, 101, 102
See application file for complete search history.

(56) References Cited

U.S. PATENT DOCUMENTS

| | | | |
|---|---|---|---|
| 5,511,186 A | | 4/1996 | Carhart et al. |
| 5,594,899 A | * | 1/1997 | Knudsen et al. ............... 707/2 |
| 5,950,207 A | * | 9/1999 | Mortimore et al. ......... 707/104.1 |
| 6,611,814 B1 | | 8/2003 | Lee et al. |
| 6,629,079 B1 | | 9/2003 | Spiegel et al. |
| 6,687,707 B1 | * | 2/2004 | Shorter ................... 707/103 R |
| 6,980,987 B2 | | 12/2005 | Kaminer |
| 2002/0147709 A1 | | 10/2002 | Rajarajan et al. |
| 2003/0023712 A1 | | 1/2003 | Zhao et al. |
| 2003/0093323 A1 | | 5/2003 | Kenyon |
| 2003/0187744 A1 | | 10/2003 | Goodridge |
| 2004/0122741 A1 | | 6/2004 | Sidman |
| 2004/0244039 A1 | * | 12/2004 | Sugahara et al. .............. 725/52 |
| 2005/0246651 A1 | | 11/2005 | Krzanowski |
| 2006/0020578 A1 | * | 1/2006 | Hood ............................ 707/3 |
| 2006/0041485 A1 | | 2/2006 | Tarvydas et al. |
| 2006/0041522 A1 | | 2/2006 | Rodriguez-Rivera |

OTHER PUBLICATIONS

"Haystack Design Philosophy", available at <<http://haystack.csail.mit.edu/developers/architecture.html>>, printed on Mar. 3, 2006, 4 pages.
"Interface Design Issues #07: The myth of navigation", available at <<http://www.designbyfire.com/000075.html>>, published Apr. 6, 2004, 24 pages.
Nielsen, "Noncommand User Interfaces", Communications of the ACM 36, Reference 95, Apr. 1993, pp. 83-99.

* cited by examiner

Primary Examiner—Kuen S Lu
(74) Attorney, Agent, or Firm—Lee & Hayes, PLLC

(57) ABSTRACT

Systems management navigation and focus collection is described. In one implementation computing-based managed items which are part of a systems management environment are navigated to locate one or more computing-based managed items. In another implementation, the computing-based managed items are indexed, and then searched to locate one or more of the computing-based managed items from among the computing-based managed items which have been indexed. The searching can be based on one or more search requests. Each of the one or more computing-based managed items located by the navigating and/or the searching is identified by a respective unique identifier, and selected ones of the unique identifiers can be collected in a focus collection where they are at least temporarily maintained for a user.

19 Claims, 8 Drawing Sheets

| Unique Identifiers | Item Type | Server Functions Enabled | Geographic Location | Model Designation | Manufacturer | Business Class | Health State |
|---|---|---|---|---|---|---|---|
| ID-104(1) | Server | SQL | Denver | Big Server | Denver Elect | Mission Critical | Resolved |
| ID-104(2) | Server | EXCH | Spokane | Denver Small | Denver Elect | Production | Healthy |
| ID-106(1) | Software | -- | Spokane | Email Pro | Mail Co. | Production | Healthy |
| ID-106(2) | Software | -- | Spokane | Fastmail | Denver Elect | Production | Resolved |

Fig. 2

SYSTEMS MANAGEMENT NAVIGATION AND FOCUS COLLECTION

BACKGROUND

Systems management often requires that a user navigate among a large number of computer-based managed items which are part of a systems management environment. The computer-based managed items can include computers, software systems, mobile phones, personal digital assistants (PDAs), and/or any other items that can be managed by a systems manager. For ease of discussion, such computer-based managed items may be referred to herein simply as "managed items" or "items". In many cases these managed items are part of complex structures and are often linked by complex relationships.

The systems manager may need to navigate among the managed items and/or to locate certain managed items in the system for a host of reasons. For example, the systems manager may simply need to evaluate the general performance of the system, or the systems manager may need to diagnose and/or repair one or more managed items. The systems manager may need to address the migration of new hardware and software into or out of the system. The systems manager may also need to locate a business system, such as an email service that is not working, or may need to make configuration changes and/or security changes to certain managed items. In any of these cases, the systems manager will typically need to locate the items requiring attention.

Navigating among and/or finding computer-based managed items in a systems management environment would not be a difficult task if the number of managed items was small. However, the task is often very difficult because the systems manager must navigate among a large numbers of managed items. For example, the systems manager may need to navigate among thousands of computers, millions of software systems, components, applications, and the like. The sheer quantity of managed items in the system can make it difficult to navigate among the items and/or to locate the items which require attention.

Systems management continues to grow more complex, in part due to computing environments that continue to become more complicated and involved. For example, companies are using a greater number of computers which are linked by increasingly complex relationships. The increasing prevalence of mobile computing devices such as laptop computers, mobile phones, and PDAs has further complicated the computing environment. Put simply, as the computing world grows more complicated and management operations become more ambitious, systems management becomes increasingly problematical. Unfortunately, the present techniques for navigating among computer-based managed items and/or finding managed items that require attention are often impractical, or at the least very inconvenient for the complex systems management environment.

One conventional technique for navigating among a large number of managed items is to use a "tree control" similar to that used for navigating among folders and files on most desktop computers. In this case, the large number of managed items is divided up into a hierarchy of groupings. One central challenge that systems managers face is that there are many reasonable ways to arrange the managed items into hierarchical groups, and if the systems manager does not understand the arrangement chosen by a software designer, it can be difficult to locate a managed item that is of interest to the systems manager.

Some other techniques support multiple simultaneous ways of arranging the managed items into "trees", which is a concept referred to as "polyarchy". A polyarchical arrangement makes it somewhat easier for the systems manger to find an item, but only if the systems manger understands and chooses one of the hierarchies that was implemented by the software designer. In some cases, the system allows an administrator to define the hierarchies to be used, but in any organization with several staff members the difficulty of understanding the hierarchies remains. Unfortunately, in many cases, even if the systems manger understands and chooses one of the hierarchies implemented by the software designer, there may be too many folders and too many items to practically navigate.

Another challenge faced by systems managers is how to select several managed items for further manipulation, when such items are located in separate navigational contexts. For example, conventional "multi-select" techniques, such as "control-click", can be difficult to use since they require a high degree of articulation when using a mouse. This is especially true when navigating among millions of items. Still further, such multi-select techniques may not even be available if finding the managed items requires navigation through different data structures, as the separate navigational steps will normally "collapse" the context.

While systems management has become increasingly complex, the present techniques for navigating among managed items, for finding managed items which require attention, and for selecting managed items for further attention, have not kept pace.

SUMMARY

This summary is intended to introduce a selection of concepts in simplified form that are further described below in the Detailed Description. This summary is not intended to identify key features or essential features of the claimed subject matter, nor is it intended for use in determining the scope of the claimed subject matter.

In one implementation, systems management navigation and focus collection describes navigating among computing-based managed items which are part of a systems management environment to locate one or more computing-based managed items of interest to a systems manager. Each of the computing-based managed items of interest located by the navigating is identified by a respective unique identifier. Selected unique identifiers are then collected into a focus collection where they are at least temporarily maintained.

In one implementation systems management navigation and focus collection describes indexing the computing-based managed items using a variety of data and unique identifiers, and then receiving a search request to locate one or more of the computing-based managed items from among the computing-based managed items which have been indexed. The systems management environment is then searched to locate the requested computing-based managed items based on the search request. Selected unique identifiers are then collected into the focus collection where they are at least temporarily maintained.

BRIEF DESCRIPTION OF THE DRAWINGS

The same numbers are used throughout the drawings to reference like features and components.

FIG. 2 illustrates an exemplary index in which embodiments of systems management and focus collection can be implemented.

DETAILED DESCRIPTION

Systems management navigation and focus collection is described in which embodiments provide that a user (e.g., systems manager) can use contextual browsing and/or search techniques to locate computing-based items of interest (e.g., various distributed computers, mobile devices, services, applications and/or other managed items) which are part of a systems management environment. In order to provide for searching in the systems management context, an index of the computing-based managed items is created. This index allows searches to be based on item types, item identities, metadata, data values, code words or classifications, or for searches to be based on any other data included in the index. Once an item of interest has been located, management actions can be taken on the item, or the item can be used as a starting point for further navigation. To further facilitate navigation, a focus collection is provided which allows the user to navigate to a managed item using any technique, and then simply place the item in the focus collection where the item can be at least temporarily maintained for the user. Once the item has been placed in the focus collection, the item will not be lost during additional navigation, even if such navigation is through different data structures.

While aspects of systems management navigation and focus collection can be implemented in any number of different computing systems, environments, and/or configurations, embodiments of systems management navigation and focus collection are described in the context of the following exemplary system architectures.

Figure 1:
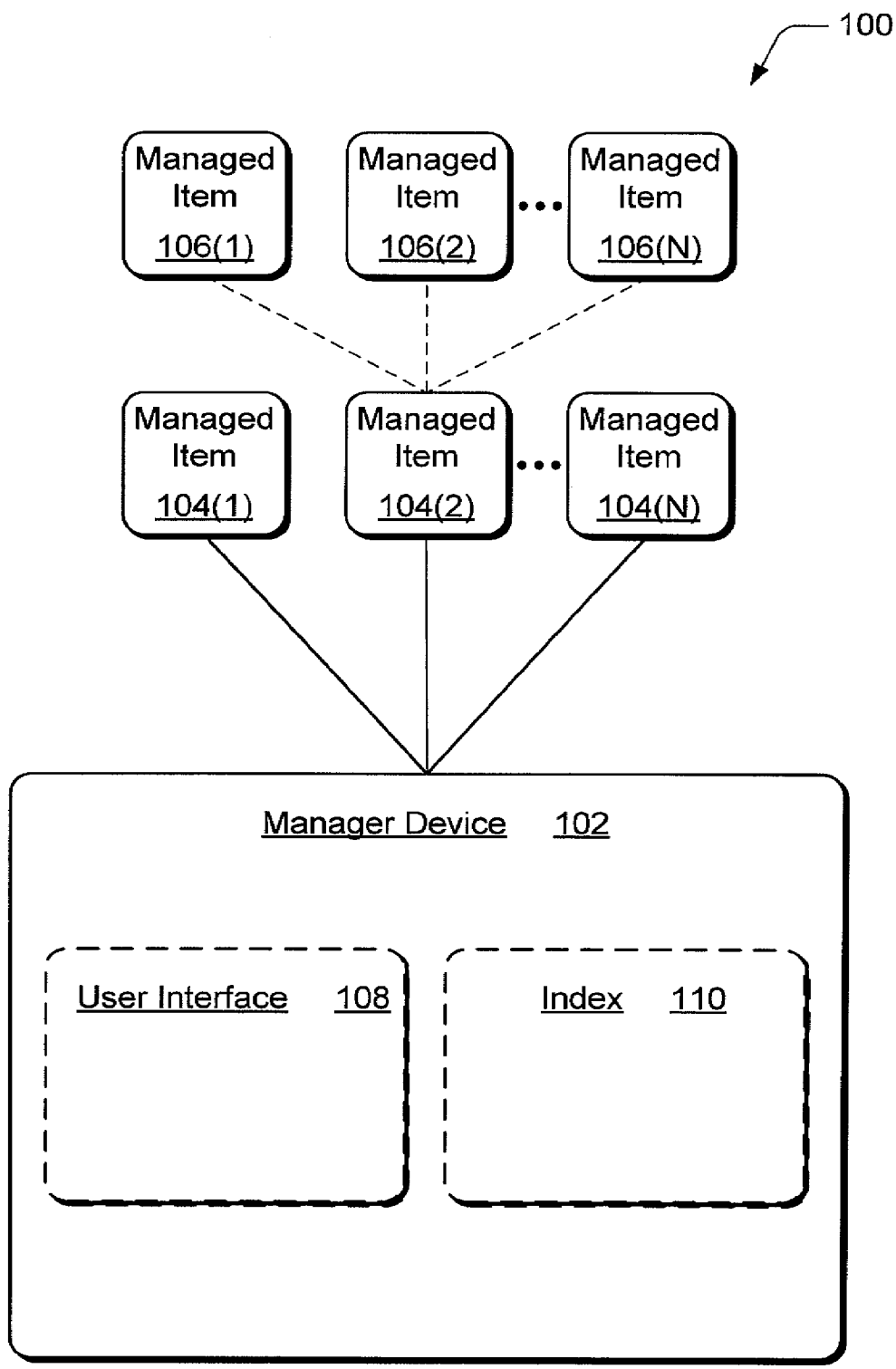
FIG. 1 illustrates an exemplary systems management system in which embodiments of systems management and focus collection can be implemented.

FIG. 1 illustrates an exemplary systems management system 100 in which embodiments of systems management navigation and focus collection can be implemented. The system 100 includes a manager device 102, computing-based managed items 104(1-N), and additional computing-based managed items 106(1-N). The computing-based managed items 104(1-N) and 106(1-N) can represent any combination of computers, software systems, mobile phones, PDAs, data storage devices, stored documents, computer-based processes, business data and/or any other items that can be managed by a systems manager as part of a systems management environment. For example, the computing-based managed items 104(1-N) can represent any number of servers or computing devices which can be managed by the systems manager via manager device 102, and the computing-based managed items 106(1-N) can represent any number of software systems or applications implemented on a managed item 104. For ease of discussion, the computer-based managed items 104(1-N) and 106(1-N) are collectively referred to herein simply as "managed items" or "items".

The manager device 102 can include a user interface 108 and an index 110. The user interface 108 and index 110 can be implemented as components of the manager device 102 (as shown in FIG. 1) and/or as separate components. In various implementations, the user interface 108 can be a graphical user interface, a command line interface, and/or a scripting system. The user interface 108 allows a user, such as a systems manager, to interact with the manager device 102 in order to manage the computer-based managed items 104(1-N) and 106(1-N).

As described in detail below, a systems manager can interact with the user interface 108 to search or otherwise navigate among the computing-based managed items 104(1-N) and 106(1-N) to locate one or more items of interest. The systems manager may need to navigate among the managed items and/or locate certain managed items in the system for a host of reasons. By way of example, the systems manager may want to locate and/or repair one or more of the managed items, or address the migration of new hardware and software into or out of the system, or make configuration changes. In any of these cases, the systems manager will typically need to locate the managed items requiring attention The index 110 is generated so that the user can use conventional search techniques to locate managed items of interest for systems management. The index 110 can be implemented using any indexing technique that can be used for a text search. To create the index 110, data associated with the computing-based managed items 104(1-N) and 106(1-N) is processed to create a look-up table that can be used for locating selected ones of the computing-based managed items 104(1-N) and 106(1-N). No particular indexing format is required, and the index can be created by simply presenting the data describing the computing-based managed items 104(1-N) and 106(1-N) to a conventional indexing service for indexing. Many different types of data can be used for the indexing, and the more data included in the index, the better the index will be. In other words, if more data is made available in the index, a search engine operating on the index will be able to do a better job searching and locating an item of interest. Of course, the overall size of the index can be managed so that the system's performance is not negatively impacted. Therefore, the present system provides that the administrator of the system can control granularity of the indexed attributes. In other words, the amount of data stored in the index per-item can be adjusted in order to maximize performance and/or to reduce the load on the indexing system.

By way of example, the different types of data used for the indexing can include: (1) the type of the managed item (e.g., Web Server, File Server, SQL Server); (2) unique properties of the managed item (e.g., the name and/or serial number of an item); (3) non-unique properties of the managed item (e.g., relatively static properties such as the size, manufacturer, model number, and/or geographic location of an item; and/or dynamically measured properties such as the amount of free disk space on an item, load on a processor, and/or service level); (4) functions enabled on the managed item (e.g., whether a server has the DNS, DHCP, or AD service enabled, or whether the server is hosting a SQL or Exchange System); (5) membership of the managed item in an information technology (IT) service (e.g., mail service, order processing service, and/or a payroll service); and (6) the business classifications of the managed item (e.g., such as mission-critical, production, or test classifications which are designations assigned by a business manager based on business judgment rather than on technical qualities of the managed item itself).

When a wide variety of data such as this is used to create the index 110, many different types of searches are possible. For example, the systems manager can use the index 110 to find computers, services, applications, and other managed items based on searching item types, item identities, metadata, data values, code words, and/or classifications of the managed items. Once an item of interest has been located, management actions can be taken on the item, or the item can be used as a starting point for farther navigation.

FIG. 2 illustrates an exemplary index 200, which can be implemented in various embodiments of systems management navigation and focus collection, and as one example, can be implemented as index 110 shown in FIG. 1. In this example, the index 200 is presented in a simplified form that includes very limited data for ease of discussion. A typical index could include thousands of computers, millions of software applications, and various mobile devices, each of which can be a listed as separate managed items in the index. Each of these items can be represented by a unique identifier which is associated with the managed item, and which identifies the associated managed item. In addition, each of the managed items which are identified by the unique identifiers can be associated with many different data fields, or data types.

For ease of discussion, the exemplary index 200 describes only four computing-based managed items using a small amount of data regarding these items. The four managed items included in index 200 are managed item 104(1) which is represented by unique identifier ID-104(1), managed item 104(2) which is represented by unique identifier ID-104(2), managed item 106(1) which is represented by unique identifier ID-106(1), and managed item 106(2) which is represented by unique identifier ID-106(2). Moving from left to right across FIG. 2, the first column is a unique identifier column 202 which lists each one of the unique identifiers. These unique identifiers (ID-104(1), ID-104(2), ID-106(1), and ID-106(2)) respectively identify the different computing-based managed items (104(1), 104(2), 106(1), and 106(2)) which have been indexed.

Continuing from left to right, the next seven columns represent different exemplary fields which have been included in index 200 (i.e., Item Type Field 204, Server Functions Enabled Field 206, Geographic Location Field 208, Model Designation Field 210, Manufacturer Field 212, Business Classification Field 214, and Health State Field 216) to describe the indexed managed items that are represented by the unique identifiers. Directly below each of the field headings are lists of values that correspond to each of the computing-based managed items which have been indexed. In this example, the managed item (104(1)) which is represented by unique identifier ID-104(1) is associated with the following values (Item Type=Server; Server Functions Enabled=SQL; Geographic Location=Denver; Model Designation=Big Server; Manufacture Denver Electronics; Business Classification=Mission Critical; and Health State=Resolved). It can therefore be appreciated that as part of the indexing, a unique identifier (such as unique identifier ID-104(1)) is respectively associated with one of the indexed computing-based managed items (such as items 104(1)). The indexing can also include associating values which describe each of the indexed computing-based managed items with field names that categorize the values by type. As described in detail herein, one or more of the values can be received as part of the search request, and then used to locate computing-based items of interest that are associated with the one or more values.

Figure 3:
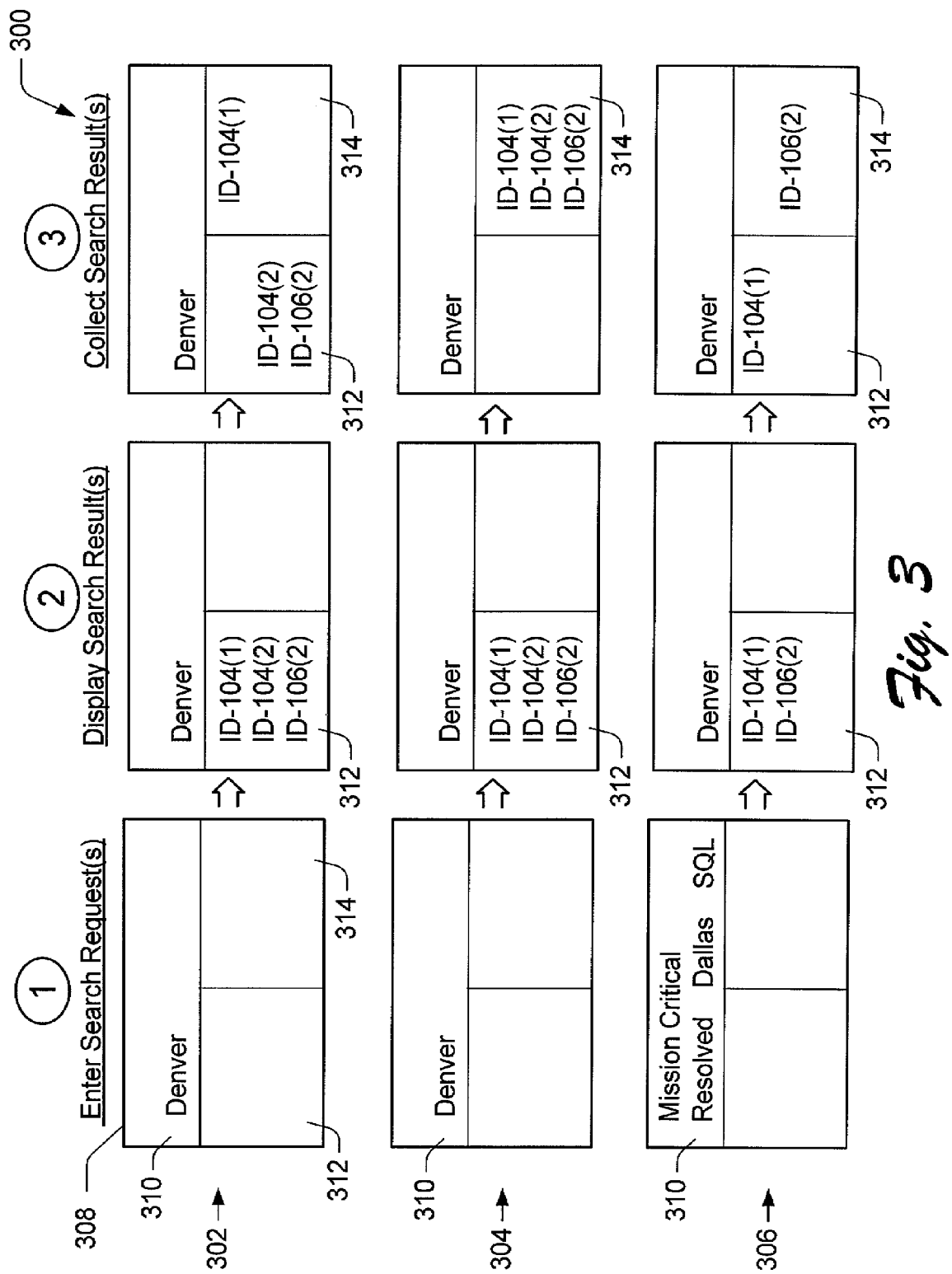
FIG. 3 illustrates exemplary scenarios in which embodiments of systems management and focus collection can be implemented.

FIG. 3 illustrates exemplary scenarios 300 in which embodiments of systems management and focus collection can be implemented, and is now described with ongoing reference to simplified index 200 (FIG. 2). FIG. 3 illustrates examples 302, 304, and 306, each of which includes a user interface 308. The user interface 308 includes a search field 310, a results field 312, and a focus collection 314. The illustration shows entry of search request(s) at step one, display of search results at step two, and collection of selected ones of the search results into a focus collection at step three.

The first example 302 illustrates entry of a single value in the search field 310 to locate a specific managed item of interest. For example, at step one a user can enter a single value such as "Denver" in the search field 310 in order to find all the managed items that are associated with that value. At step two, the results of the search are displayed in results field 312. The search located three managed items (represented by unique identifiers ID-104(1), ID-104(2), and ID-106(2)) which are associated with the value "Denver". By reviewing the index 200, one can appreciate that one of the items (e.g., ID-104(1)) is associated not only with the geographic location, "Denver", but is also associated with the manufacturer "Denver Electronics", while the other two items (ID-104(2) and ID-106(2)) located by the search are each associated with a manufacturer "Denver Electronics" but are not associated with the geographic location "Denver". At step 3, if the user is looking for managed items located in the geographic location "Denver", the user can examine the search results, and then place the item associated with the geographic location, "Denver" (represented by the unique identifier ID-104(1)) into a focus collection 314 as shown.

A search request that includes a value (e.g., "Denver" as shown in FIG. 3, example 302) but without referencing a field name associated with the value is often referred to as an "unspecified search". Unspecified searches can be very convenient to the user, but in some circumstances such searches may return unintended results. For example, as described above, even though the user may only be interested in managed items that are located in the geographic location "Denver", the search phrase "Denver" may also locate all managed items manufactured by "Denver Electronics" even if such items are located in some other city. In order to avoid such spurious search results, the search system can also support searches using more specific expressions, such as "geographic location=Denver".

Referring now to example 304, at step one, the user again enters the single value "Denver" in the search field 310, and at step two all the managed items which are associated with that value are displayed in results field 312. The search located three managed items (respectively represented by unique identifiers ID-104(1), ID-104(2), and ID-106(2)) which are associated with the value "Denver". One of the items (ID-104(1)) is associated not only with the geographic location, "Denver", but is also associated with the manufacturer "Denver Electronics", while the other two items (ID-104(2) and ID-106(2)) located by the search are each associated with the manufacturer "Denver Electronics" but are not associated with the geographic location "Denver". At step 3, if the user is looking for managed items manufactured by "Denver Electronics", the user can examine the search results, and then place the managed items associated with the manufacturer, "Denver Electronics" (represented by the unique identifiers ID-104(1), ID-104(2), and ID-106(2)) into a focus collection 308, as shown. Here, since all three items are associated with the manufacturer "Denver Electronics", all three items are placed in the focus collection 314.

As other examples of single value searches, the user can enter "SQL" to find all managed items which are SQL Servers, or "Mission-Critical" to find all managed items which have been categorized as mission-critical, or "Server" to find all managed items that are servers.

Referring now to example 306, search expressions can also be specified as combinations of values. For example, at step one the search expression includes the combinations of values, "mission-critical resolved Dallas SQL," and all managed items that match all or some criteria can be found. As illustrated at step two, the search results are ID-104(1) and ID-106(2). Unique identifier ID-104(1) is associated with the values "Mission-Critical", "Resolved", and "SQL", and the unique identifier ID-106(2) is associated with the value "Resolved". The value "Dallas" which was included in the search did not have a match in the index 200. However, it is not necessary that all the values used in such multi-phrase searches match values used in the index 200, as "soft searches" can be supported. In other words, when the search request includes at least one value which is not included in the index 200, but also includes at least one value which is included in the index 200, the search to locate the requested computing-based managed items can be based on the one value which is included in the index. At step three, if after examining the search results the user decides that the managed item represented by unique identifier ID-106(2) is of interest, the user can place the unique identifier ID-106(2) into a focus collection 314, as shown. It should be appreciated that in the context of systems management, the ability to perform "soft searches" for locating managed items of interest may offer many advantages over conventional database queries.

Although the exemplary searching described with reference to FIG. 3 only pertains to a limited amount of data, the index and data used to perform the searching can be much more involved. For example, the search can operate on the type system, detecting classes of items such as "SQL Server", and on the data in the instances of those classes. The search can also operate on ancillary metadata that may be specified for the purpose of aiding a search, such as classification tags like "Database" for "SQL Server", and phrase synonyms like "Monitor" for "Display". The expression "type system" is used herein in a very general sense to describe that the search may be implemented with object technology in which case terms like "classes" and "instances" are directly represented in the index, or with more conventional relational database technology in which case the "item types" are represented in other ways.

It should be appreciated that the index 200 can include not only the relatively static configuration data (such as "Manufacturer"), but can also include dynamic data that describes a state of a computing-based managed item which can change over time. The dynamic data describing the state of a computing-based managed item can be updated as the state of the computing-based managed item changes, thereby indicating an updated state of the computing-based managed item. One example, of such dynamic data is data describing a "Health State" of a managed item, as shown in index 200. For example, in the case of dynamic data relating to the "Health State", a search for "Resolved" could return any alerts for managed items which have experienced a "severe health problem" which has been resolved.

Because dynamic data changes over time, the index 200 can be periodically updated. Index updating can take place as soon as the updated data is received, or alternatively, the indexing can proceed asynchronously in the background while other work is done, in order to generate a more responsive environment.

Figure 4:
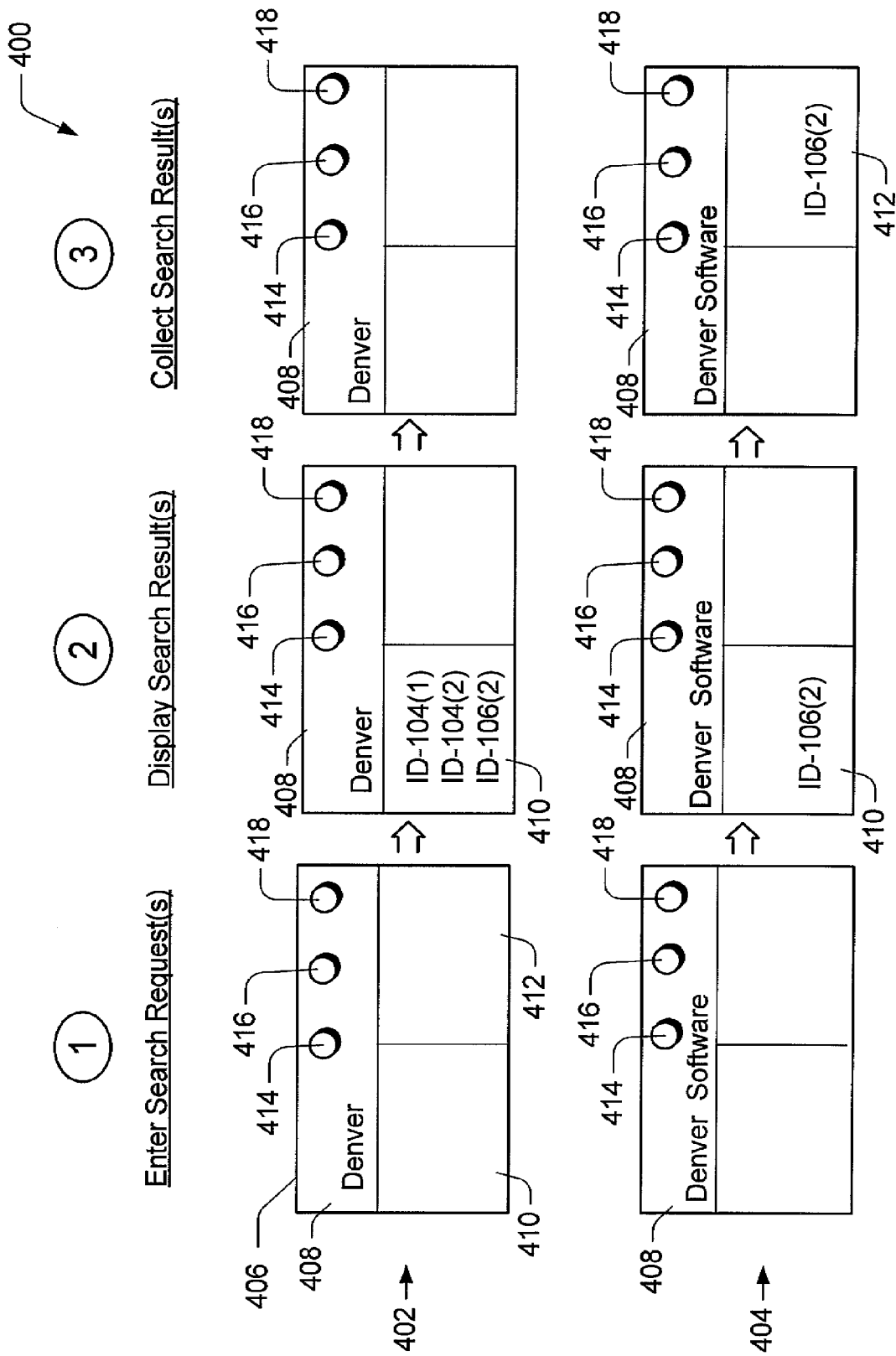
FIG. 4 illustrates exemplary scenarios in which embodiments of systems management and focus collection can be implemented.

FIG. 4 illustrates exemplary scenarios 400 in which embodiments of systems management and focus collection can be implemented, and is now described with ongoing reference to index 200 (FIG. 2). FIG. 4 illustrates examples 402 and 404, each of which includes a user interface 406. The user interface 406 includes a search field 408, a results field 410, and a focus collection 412. The illustration shows entry of search request(s) at step one, display of search results at step two, and collection of selected ones of the search results into the focus collection at step three.

In one implementation the system can provide the user with an option to update (or refresh) the index. In the illustrated example, the user interface 406 provides the user with a selectable refresh control 414, which when selected initiates that the index be refreshed. This can be very helpful in situations when latency is not acceptable to the user. When a request to update the indexing is made by a user, the dynamic data is updated, and the user can avoid receiving latent information from the search.

In one implementation the user can be presented with an option to construct a "find-more-like-this" search. In the illustrated example, the user interface 406 provides the user with a selectable find-more-like-this control 416, which when selected, initiates that a find-more-like-this search be constructed. In this case, once the search results identifying the one or more computing-based managed items located by the searching have been displayed to the user, the user can request that the find-more-like-this search be constructed based on characteristics of the displayed search results. The find-more-like-this search is designed to locate additional -computing-based managed items which share a common characteristic with the one or more computing-based managed items which have been identified. This may be achieved by the system retrieving the characteristics of the computing-based managed items which have been identified and constructing a search request with those characteristics. This search will of necessity use the "soft search" technique that includes items that do not completely match the search requests, as otherwise only the original item would be included. Other implementations may be possible, for example, where the index contains some type of "digest" constructed from the characteristics of the system and the search is performed directly on the digest, or by other means.

In one implementation the user can be presented with an option to select that search results be progressively refined. In the illustrated example, the user interface 406 provides the user with a selectable progressively refine control 418, which when selected, initiates a request that the search results be progressively refined. Once this request has been received, the search results can be progressively refined as additional search requests that further identify the requested computing-based managed items are received. The progressively refined search results can be displayed for the user via the user interface 406. This may be achieved by searching the relatively short list of items in the search result field 410, by constructing a search request that includes the additional refinement terms as well as a strict requirement that the unique identifiers be included, or by other means.

In example 402, at step one, the user selects the progressively refine control 418, thereby initiating a request that search results be progressively refined. The user then enters a value "Denver" in the search field 408 in order to find all the managed items that are associated with that value. At step two the results of the search are displayed in results field 410. The search is shown to have located three managed items (e.g., represented by unique identifiers ID-104(1), ID-104(2), and ID-106(2)) which are associated with the value "Denver".

One of the items (represented by unique identifier ID-104(1)) is associated with the geographic location, "Denver" and is also associated with the manufacturer "Denver Electronics", while the other two items located by the search (respectively represented by unique identifiers ID-104(2) and ID-106(2)) are each associated with the manufacturer "Denver Electronics" but not with the geographic location "Denver". After examining the search results, the user can place an item into the focus collection 412, or can chose to enter one or more addition search values. In the illustrated example, the user decides to add an addition search term as described below.

In example 404, at step one, a user enters an additional value "Software" in the search field 408. In response to this entry, a search that progressively narrows the search results is initiated. At step two the search is shown to have located only one managed item (represented by unique identifier ID-106(2)) which is associated with both the value "Denver" and with the value "Software". The other managed items (respectively represented by unique identifiers ID-104(1), ID-104(2)) which were included in the initial search result are no longer displayed, since these items are not associated with the value "Software". At step three, the user can place the one managed item (represented by unique identifier ID-106(2)) into a focus collection 412 as show, or can continue to perform other searches.

In other implementations, various options are provided to make the search function more convenient for the user. In one implementation, the search expressions can be stored for future use. In another implementation, the user may have the option of naming a search expression so that it will be easier to recognize the meaning of a complex search expression. Such search expressions can be presented in a "combobox" control or similar list associated with a search entry field, but may also be rendered as virtual folders (not shown). In addition, a query type, such as "Server Role", may be presented to the user as a virtual folder, and a set of distinct server roles may be rendered as virtual sub-folders at the next level. In addition to allowing the user to explicitly designate search expressions to be saved for future use, the system may also automatically store recently used search expressions and present them for reuse.

In another implementation, rather than executing the search in a global context which produces all items known to the management device 102 that match the search criteria, the search can instead be applied incrementally within a local context. In other words, the user can navigate to a specific location, or to a specific type of managed item, and then search from there using any of the search techniques discussed herein. In this case, the search is used as an incremental filter on any display of managed items, which in effect means that the un-contextualized search can be considered an incremental filter based on the root of the system.

In another implementation, the user may simply point to a word in any display and a search is performed based on that word. For example, after navigating to a specific managed item (e.g., a computer system), a display in the user interface may list all the services running on that computer. The user may then simply point to one of services, such as "SQL", and thereby invoke a search based on that word in order to locate other SQL servers. Similar searches can be made based on other attributes of the system 100, in effect creating lists of systems similar in some sense, to the current systems.

Systems management solutions often present diagrams showing network topologies, service topologies, or other structures in the form of graphical diagrams (i.e., icons and connecting lines). In one implementation, the management device 102 can present a contextualized search from each node or connector shown in such diagrams, such as "find servers of the same type", "find servers with the same roles enabled", or "find other mission-critical systems". In another implementation, the user can simply "click on" a symbol in the network topology diagram to search for the managed item represented by that symbol.

Although the search techniques described herein are most often invoked explicitly by a user, another implementation automatically performs a search as the user is entering data into the user interface. For example, as the user enters a description of a problem, the system may display a list of documentation, diagnostic processes, or related incidents that are relevant to the problem as described so far, and as the user adds descriptive terms to the problem description, the list of relevant data becomes more focused.

Although the search techniques described herein are most often used in a GUI, such search techniques can also useful in character-based user interfaces (often called "command line interfaces (CLIs)") or in scripting systems. The same indexing and search techniques, and the same data and metadata, support GUIs, CLIs, and scripts. For systems that support more than one user interface technique, one implementation uses the same technique and the same data as the basis for search, regardless of the interface technique. This can be done to ensure that corresponding operations in the different techniques will return the same results and provide consistent behavior.

As described above with reference to FIGS. 3 and 4, after navigating to the computing-based managed items (respectively identified by unique identifiers), whether using conventional techniques based on containers and relationships, or search-based techniques as described above, selected ones of the unique identifiers can be collected into a focus collection (e.g., focus collections 314 and 412) where the selected ones of the unique identifiers are at least temporarily maintained for the systems manager. The use of a focus collection (e.g. 314, 412) resolves many of the difficulties systems managers face when selecting several managed items for further manipulation, especially when such items are located in separate navigational contexts. The system can require that the user explicitly collects some of the unique identifiers into a focus collection (e.g., 314, 412), or can alternatively consider the complete set of unique identifiers produced by the navigation and search to be a default focus collection.

When a focus collection (e.g., 314, 412) is made available to the user, the user can navigate to a managed item using any technique (e.g., folder navigation and/or search), and can then simply collect managed items of interest in the focus collection (e.g., 314, 412) where the items will not be lost during additional navigation. Therefore, the managed items collected in the focus collection (e.g., 314, 412) can be the result of any one of a multitude of navigation and search techniques. For example, the user can make one query which locates some items of interest which can be placed in the focus collection (e.g., 314, 412), and then do another query to find additional items of interest which can be added to the focus collection (e.g., 314, 412), and so forth. Thus, the items of interest can be located incrementally base on any number of queries, and collected in the focus collection (e.g., 314, 412). There is no need for the user to construct one "clever" query which will locate all the items of interest. Since the construction of "clever" or "complex" queries is an art and science which requires logic training and/or experience, the ability to put forward several simple queries and locate the items of interest is a great advantage to users who do not have the requisite logic training and/or experience to construct "clever" or "complex" queries.

After collecting items in the focus collection (e.g., 314, 412), the user can perform various operations on one or more of the collected managed items. The user can pick-and-choose items from the focus collection (e.g., 314, 412) based on any criteria. For example, the user can choose to perform operations on a single item in the focus collection, on a group of items sharing one or more characteristics, or on any other combination of items. As another example, after repeatedly adding managed items to the focus collection (e.g., 314, 412), the user can perform various operations on all those managed items together.

Any conventional user interaction gestures can be used for placing managed items in the focus collection (e.g., 314, 412), including clicking a button in an action list, making a selection from a menu, pressing a keystroke combination, and/or dragging-and-dropping the items into the focus collection. Therefore, once the systems manager has located a set of several managed items and these managed items have been placed in the results list (e.g., results list 312 and 410), then selected ones of the managed items from the results list can be easily placed into the focus collection (e.g., focus collection 314, 412). It should be noted that, although via the user interface display (e.g., 308, 406) it may appear that selected ones of the managed items are themselves being moved from the results list (e.g., 312, 410) and placed into the focus collection (e.g., 314, 412), the systems manager is really collecting selected ones of the unique identifiers into the focus collection (e.g., 314, 412).

In one implementation, there is no need for the user to manage the focus collection (e.g., 314, 412), such as by deleting it after use, since the focus collection (e.g., 314, 412) can be a transient construct which is automatically discarded when it is no longer needed. In one implementation, the focus collection (e.g., 314, 412) can be saved for future use, either under an automatically generated name or under a name specified by the user. In another implementation, the system can keep the most recently used focus collection (e.g., 314, 412) for a period of time, eventually discarding the least recently used focus collection (e.g., 314, 412) after a reasonable time period. The user may choose to save the focus collections (e.g., 314, 412) at the local computer. Alternatively, the user can save the focus collections (e.g., 314, 412) in a central database together with other management data, since saving the focus collection (e.g., 314, 412) to the central database allows the user to access and re-use saved focus collections even when using the system from a different computer, and to share the focus collection with others.

In yet another implementation, the user (e.g., systems manager) performs a search or a folder navigation, and then adds one or more managed items located by the search or folder navigation to the focus collection (e.g., 314, 412). If the focus collection (e.g., 314, 412) is saved and then re-used later, the same managed items will still be available in the focus collection (e.g., 314, 412). In such a case, there is no need for the search to be re-executed or for the folder contents to be re-evaluated.

in another implementation, the search expression or the folder itself can be added to the focus collection (e.g., 314, 412). In this case, performing operations on the focus collection (e.g., 314, 412) have the same behavior, and locate the same set of managed items. However, when the focus collection is re-used, the search or folder contents are typically re-evaluated.

The focus collection (e.g., 314, 412) can be used in a GUI, in a CLI, or a scripting system, with consistent behavior. Although systems management navigation and focus collection may be implemented separately in each type of environment and provides the benefits discussed herein, the focus collection (e.g., 314, 412) can be implemented in a common underlying service that allows sharing of stored focus collections and other information across all types of interfaces.

Figure 5:
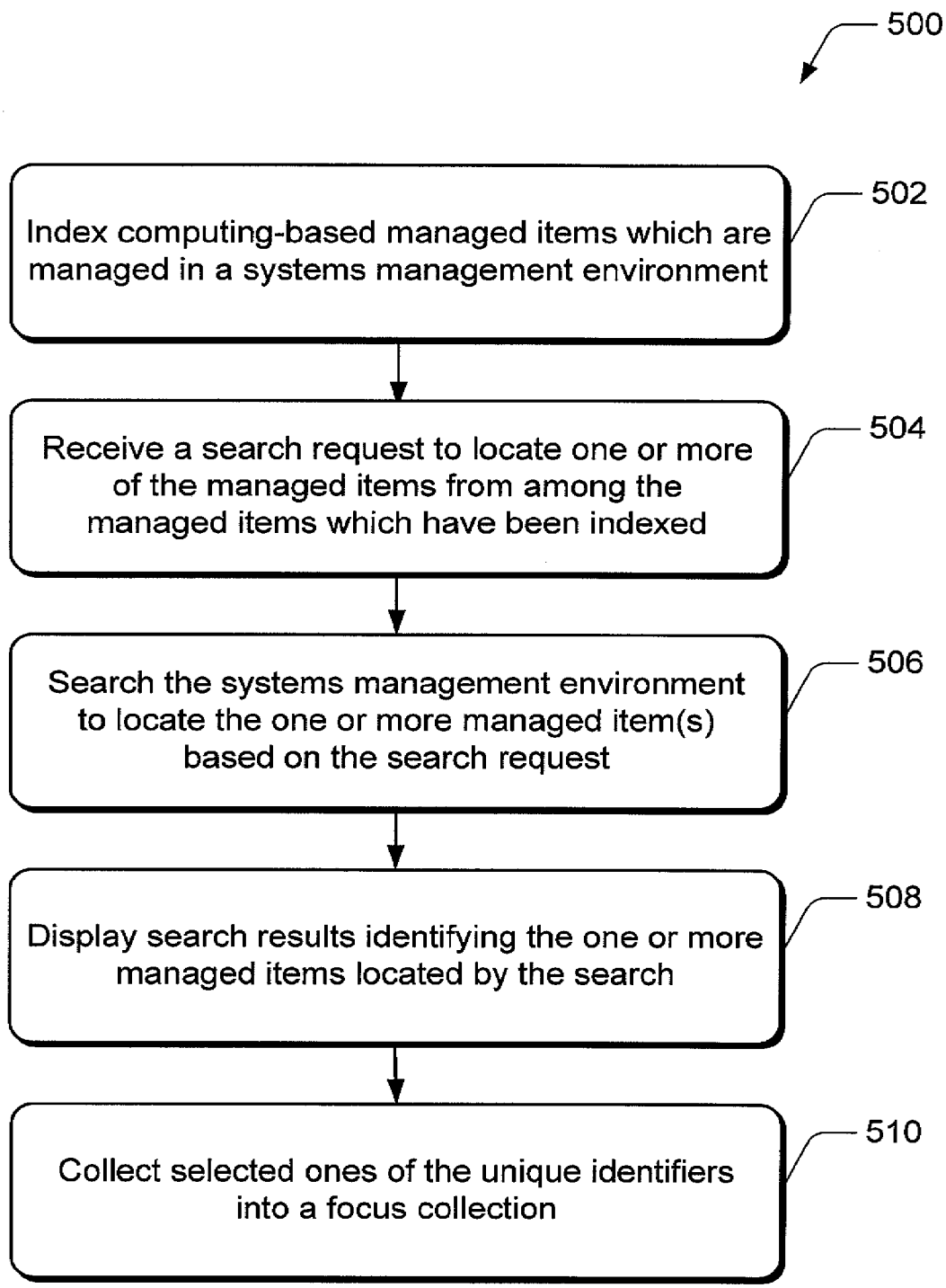
FIG. 5 illustrates exemplary method(s) for systems management and focus collection.
Figure 6:
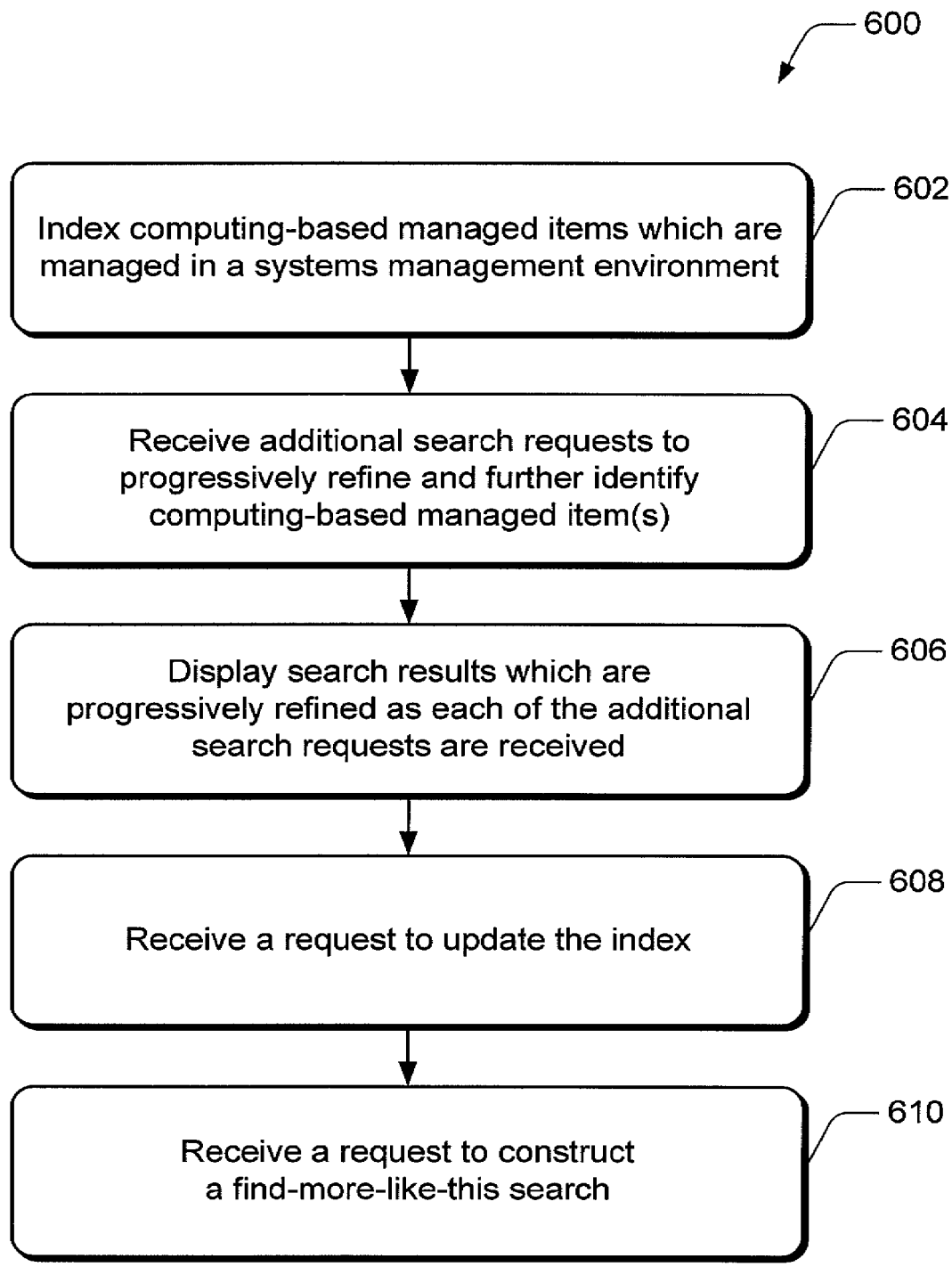
FIG. 6 illustrates exemplary method(s) for systems management and focus collection.
Figure 7:
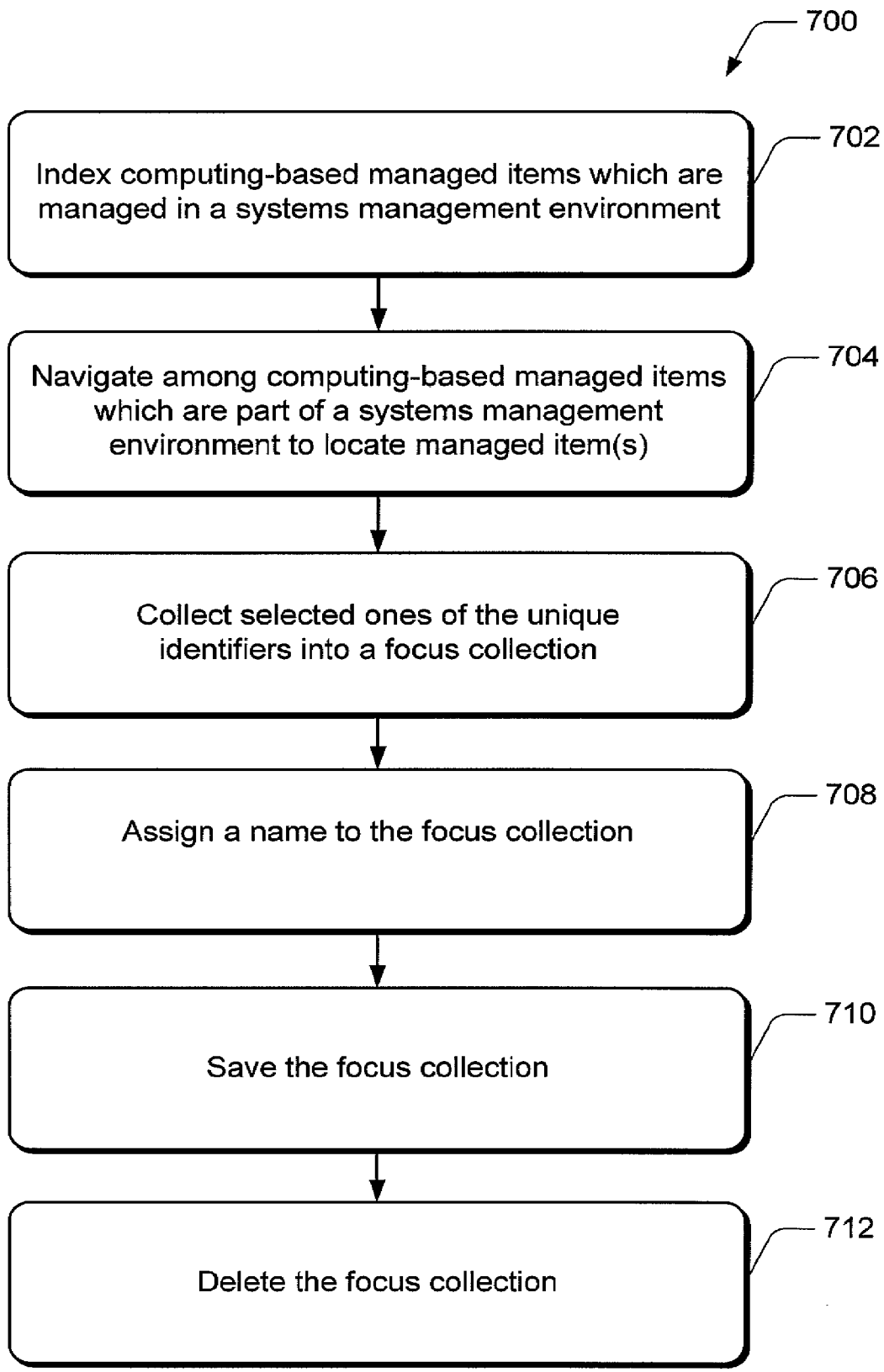
FIG. 7 illustrates exemplary method(s) for systems management and focus collection.

Methods for systems management navigation and focus collection, such as exemplary methods 500, 600, and 700 which are described respectively with reference to FIGS. 5, 6, and 7, may be described in the general context of computer executable instructions. Generally, computer executable instructions can include applications, routines, programs, items, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

FIG. 5 illustrates an exemplary method 500 for systems management navigation and focus collection, and is described with reference to the systems management system 100 shown in FIG. 1, the exemplary index 200 shown in FIG. 2, and the exemplary scenarios 300 shown in FIG. 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 502, the computing-based managed items which are managed in a systems management environment are indexed, such that a unique identifier is respectively associated with each one of the computing-based managed items in an index. For example, managed items (e.g., 104(1) and 104(2)) which can be managed in a systems management context can be indexed, such that a unique identifier (e.g., ID-104(1) and ID-104(2)) is respectively associated with each one of the computing-based items in the index 200.

At block 504, a search request is received to locate one or more of the computing-based managed items from among the computing-based managed items which have been indexed. For example, a user can enter a search request using manager device 102 to locate one or more of the computing-based managed items from among the computing-based managed items which have been indexed. Receipt of such a search request is illustrated at FIG. 3, example 302, where the search request "Denver" is shown in search field 310.

At block 506, the systems management environment is searched to locate the one or more computing-based managed items based on the search request, such that each of the one or more computing-based managed items located when searching is identified by the unique identifier associated with that item. For example, the manager device 102 can search the systems management environment to locate the one or more computing-based managed items based on the search request.

At block 508, the results of the search, identifying the one or more managed items located by the search, are displayed. For example, the manager device 102 can display the results of the search via the user interface 108. Display of the search results located by such a search is also illustrated at FIG. 3, example 302, where the search results "ID-104(1), ID-104(2), and ID-106(2)" are displayed in the search results field 312. In one implementation, the user interface 108 includes a details pane which can display details associated with each of the search result, and an actions pane and toolbar for taking action one or more items which have been located by the search.

At block 510, selected ones of the unique identifiers are collected into a focus collection where the selected ones of the unique identifiers are at least temporarily maintained for the systems manager or other user. For example FIG. 3, example 302, step three, illustrates collecting a selected one of the unique identifiers "e.g., unique identifier ID-104(1)" in the focus collection 314.

FIG. 6 illustrates an exemplary method 600 for systems management navigation and focus collection, and is described with reference to the systems management system 100 shown in FIG. 1, the exemplary index 200 shown in FIG. 2, and the exemplary scenarios 400 shown in FIG. 4. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 602, the computing-based managed items, which are managed in a systems management environment, are indexed such that a unique identifier is respectively associated with each one of the computing-based managed items. For example, managed items (e.g., 104(1) and 104(2)) which can be managed in a systems management context can be indexed, such that a unique identifier (e.g., ID-104(1) and ID-104(2)) is respectively associated with each one of the computing-based items in the index 200.

At block 604, additional search requests to progressively refine and further identify the one or more computer-based managed items are received. FIG. 4 illustrates a selectable progressively refine control 418 which can be selected to initiate a request that search results be progressively refined as additional search requests that further identify the requested computing-based managed items are received. Once this request has been received, the search results can be progressively refined as the additional search requests that further identify the one or more computing-based managed items are received.

At block 606, the displayed search results are progressively refined as each of the additional search requests is received. For example, in as illustrated in example 402, there are initially three items (represented respectively by unique identifiers ID-104(1), ID-104(2), and ID-106(2)) displayed in the initial search result 410. In example, 404, the additional value "Software" is entered and the search results are refined, so that the search results field 410 displays only one managed item (represented by unique identifier ID-106(2)) which is associated with both the value "Denver" and with the value "Software". The other two items (represented respectively by unique identifiers ID-104(1) and ID-104(2)) which were included in the initial search result 410 shown in example 402, are no longer displayed, since they are not associated with the value "Software".

At block 608, a request to update the index has been received, such that the dynamic data is updated to avoid receiving latent information associated with the one or more computing-based managed items. For example, FIG. 4 illustrates a selectable refresh control 414 which can be selected by a user to initiate a request that the index be updated (or refreshed).

At block 610, a request to construct a "find-more-like-this" search based on characteristics of the displayed search results is received. The "find-more-like-this" search is designed to locate additional computing-based managed items which share a common characteristic with the one or more computing-based managed items which have been identified. For example, FIG. 4 illustrates a selectable find-more-like-this control 416 which can be selected to initiate a request to construct a "find-more-like-this" search.

FIG. 7 illustrates an exemplary method 700 for systems management navigation and focus collection, and is described with reference to the systems management system 100 illustrated in FIG. 1, the exemplary index 200 illustrated in FIG. 2, and the exemplary scenarios 300 illustrated in FIG. 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 702, the computing-based managed items which are managed in a systems management environment are indexed, such that a unique identifier is respectively associated with each one of the computing-based managed items. For example, managed items (e.g., 104(1) and 104(2)) which can be managed in a systems management context can be indexed, such that a unique identifier (e.g., ID-104(1) and ID-104(2)) is respectively associated with each one of the indexed computing-based items. An exemplary index 200 illustrating such indexing is provided at FIG. 2.

At block 704, the computing-based managed items which are part of a systems management environment are navigated to locate one or more computing-based managed items. Each of the computing-based managed items is located by a unique identifier. For example, a systems manager (or other user) can use user interface 108 to navigate among the computing-based managed items using conventional techniques based on containers and relationships, or can navigate among the computing-based managed items using the search-based techniques described herein.

At block 706, selected ones of the unique identifiers are collected into a focus collection where the selected ones of the unique identifiers are at least temporarily maintained. Example 302, illustrates collecting a selected one of the unique identifiers "ID-104(1)" in the focus collection 314.

At block 708, a name can be assigned to the focus collection. For example, the name can be automatically generated and assigned to the focus collection 314 by manager device 102, or a name specified by the user via the user interface 108.

At block 710, the focus collection can be saved. For example, the manager device 102 can automatically save the most recently used focus collection for a period of time, eventually discarding the least recently used focus collection after a reasonable time period, or the focus collection can be saved by the user via the user interface 108.

At block 712, the focus collection can be deleted. For example, the manager device 102 can automatically delete the focus collection 314 when it is no longer needed. In other cases, the focus collection 314 can be automatically delete after a reasonable time period, or the focus collection 314 can be can be deleted by the user via the user interface 108.

Figure 8:
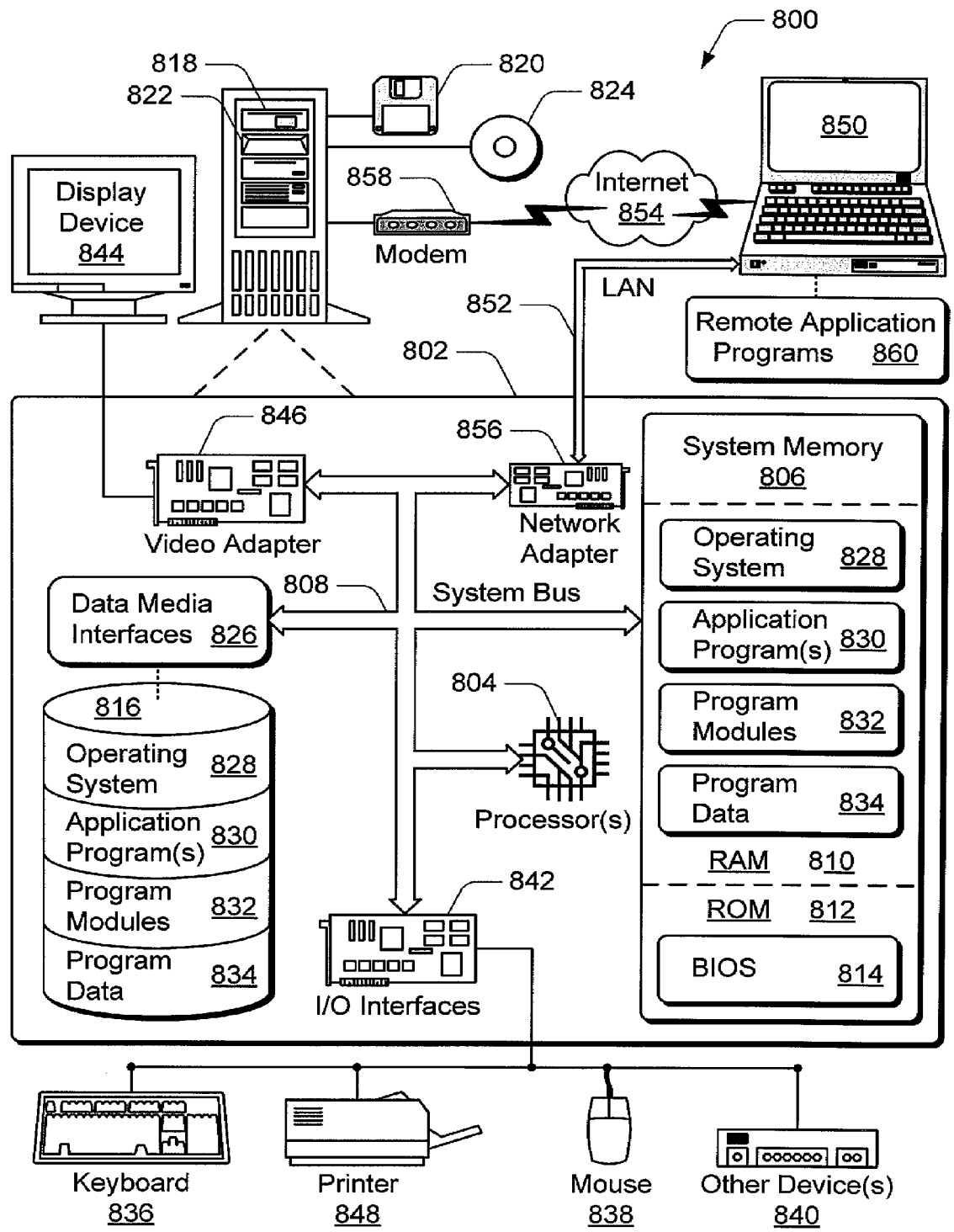
FIG. 8 illustrates an exemplary general computer-based environment in which embodiments of systems management navigation and focus collection can be implemented.

FIG. 8 illustrates an exemplary computing environment 800 within which systems management navigation and focus collection, as well as the computing, network, and system architectures described herein, can be either fully or partially implemented. Exemplary computing environment 800 is only one example of a computing system and is not intended to suggest any limitation as to the scope of use or functionality of the architectures. Neither should the computing environment 800 be interpreted as having any dependency or requirement relating to any one or combination of components illustrated in the exemplary computing environment 800.

The computer and network architectures in computing environment 800 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, programmable consumer electronics, network PCs, minicomputers, mainframe computers, distributed computing environments that include any of the above systems or devices, and the like.

The computing environment 800 includes a general-purpose computing system in the form of a computing device 802. The components of computing device 802 can include, but are not limited to, one or more processors 804 (e.g., any of microprocessors, controllers, and the like), a system memory 806, and a system bus 808 that couples the various system components. The one or more processors 804 process various computer executable instructions to control the operation of computing device 802 and to communicate with other electronic and computing devices. The system bus 808 represents any number of several types of bus structures, including a memory bus or memory controller, a peripheral bus, an accelerated graphics port, and a processor or local bus using any of a variety of bus architectures.

Computing environment 800 includes a variety of computer readable media which can be any media that is accessible by computing device 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814 maintains the basic routines that facilitate information transfer between components within computing device 802, such as during start-up, and is stored in ROM 812. RAM 810 typically contains data and/or program modules that are immediately accessible to and/or presently operated on by one or more of the processors 804.

Computing device 802 may include other removable/non-removable, volatile/non-volatile computer storage media. By way of example, a hard disk drive 816 reads from and writes to a non-removable, non-volatile magnetic media (not shown), a magnetic disk drive 818 reads from and writes to a removable, non-volatile magnetic disk 820 (e.g., a "floppy disk"), and an optical disk drive 822 reads from and/or writes to a removable, non-volatile optical disk 824 such as a CD-ROM, digital versatile disk (DVD), or any other type of optical media. In this example, the hard disk drive 816, magnetic disk drive 818, and optical disk drive 822 are each connected to the system bus 808 by one or more data media interfaces 826. The disk drives and associated computer readable media provide non-volatile storage of computer readable instructions, data structures, program modules, and other data for computing device 802.

Any number of program modules can be stored on RAM 810, ROM 812, hard disk 816, magnetic disk 820, and/or optical disk 824, including by way of example, an operating system 828, one or more application programs 830, other program modules 832, and program data 834. Each of such operating system 828, application program(s) 830, other program modules 832, program data 834, or any combination thereof, may include one or more embodiments of the systems and methods described herein.

Computing device 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 802 via any number of different input devices such as a keyboard 836 and pointing device 838 (e.g., a "mouse"). Other input devices 840 (not shown specifically) may include a microphone, joystick, game pad, controller, satellite dish, serial port, scanner, and/or the like. These and other input devices are connected to the processors 804 via input/output interfaces 842 that are coupled to the system bus 808, but may be connected by other interface and bus structures, such as a parallel port, game port, and/or a universal serial bus (USB).

A display device 844 (or other type of monitor) can be connected to the system bus 808 via an interface, such as a video adapter 846. In addition to the display device 844, other output peripheral devices can include components such as speakers (not shown) and a printer 848 which can be connected to computing device 802 via the input/output interfaces 842.

Computing device 802 can operate in a networked environment using logical connections to one or more remote computers, such as remote computing device 850. By way of example, remote computing device 850 can be a personal computer, portable computer, a server, a router, a network computer, a peer device or other common network node, and the like. The remote computing device 850 is illustrated as a portable computer that can include any number and combination of the different components, elements, and features described herein relative to computing device 802.

Logical connections between computing device 802 and the remote computing device 850 are depicted as a local area network (LAN) 852 and a general wide area network (WAN) 854. Such networking environments are commonplace in offices, enterprise-wide computer networks, intranets, and the Internet. When implemented in a LAN networking environment, the computing device 802 is connected to a local network 852 via a network interface or adapter 856. When implemented in a WAN networking environment, the computing device 802 typically includes a modem 858 or other means for establishing communications over the wide area network 854. The modem 858 can be internal or external to computing device 802, and can be connected to the system bus 808 via the input/output interfaces 842 or other appropriate mechanisms. The illustrated network connections are merely exemplary and other means of establishing communication link(s) between the computing devices 802 and 850 can be utilized.

In a networked environment, such as that illustrated with computing environment 800, program modules depicted relative to the computing device 802, or portions thereof, may be stored in a remote memory storage device. By way of example, remote application programs 860 are maintained with a memory device of remote computing device 850. For purposes of illustration, application programs and other executable program components, such as operating system 828, are illustrated herein as discrete blocks, although it is recognized that such programs and components reside at various times in different storage components of the computing device 802, and are executed by the one or more processors 804 of the computing device 802.

Although embodiments of systems management navigation and focus collection have been described in language specific to structural features and/or methods, it is to be understood that the subject of the appended claims is not necessarily limited to the specific features or methods described. Rather, the specific features and methods are disclosed as exemplary implementations of systems management navigation and focus collection.

The invention claimed is:

1. A method comprising:
   indexing computing-based managed items which are managed in a systems management environment, such that a unique identifier is respectively associated with each one of the computing-based managed items in an index, wherein:
   the indexing includes associating values that respectively describe each one of the computing-based managed items with field names that categorize the values by type; and
   one or more of the values are used as part of the search request;
   receiving a search request to locate one or more of the computing-based managed items from among the computing-based managed items which have been indexed, the search request comprising at least one value that is not included in the index and at least one value that is included in the index;
   searching the systems management environment to locate the one or more computing-based managed items based on the search request, wherein the searching to locate the one or more computer-based managed items is based on the at least one value that is included in the index; and
   collecting the one or more located computer-based managed items through a user selecting one or more unique identifiers into a focus collection, each of the one or more unique identifiers associating with the one or more located computer-based managed items, wherein the focus collection is configured to:
   collect incrementally, based on a plurality of different search requests, the selected one or more located computer-based items; and
   at least temporarily maintain all of the selected one or more computer-based items within the focus collection such that all of the selected one or more located computer-based managed items in the focus collection are not lost when the plurality of different search requests are conducted within the systems management environment.

2. A method as recited in claim 1, wherein the computing-based managed items include any combination of one or more: computer systems, software, networks, mobile devices.

3. A method as recited in claim 1, wherein the selected ones of the unique identifiers that are at least temporarily maintained at the focus collection are for a systems manager.

4. A method as recited in claim 1, wherein the search request includes a value without referencing a field name associated with the value.

5. A method as recited in claim 1, wherein the indexing includes dynamic data that describes a state of a computing-based managed item, and wherein the dynamic data is updated over time as the state of the computing-based managed item changes to indicate an updated state of the computing-based managed item.

6. A method as recited in claim 5, further comprising receiving a request to update the indexing, such that the dynamic data is updated to avoid receiving latent information associated with the one or more computing-based managed items.

7. A method as recited in claim 1, further comprising:
   receiving additional search requests to progressively refine a previous search request;
   searching the one or more computing-based items to locate the one or more computing-based items that satisfy the additional search requests, wherein the one or more computing-based items are located as a search result based on the previous search request; and
   displaying search results which are progressively refined as each of the additional search requests are received.

8. A method as recited in claim 1, further comprising:
   displaying search results identifying the one or more computing-based managed items located by the searching;
   receiving a request to construct a find-more-like-this search based on characteristics of the displayed search results, the find-more-like-this search designed to locate additional computing-based managed items that share a common characteristic with the one or more computing-based managed items which have been identified;
   constructing the find-more-like-this search, the constructing comprising:
   retrieving characteristics of the one or more computing-based managed items which have been identified; and
   building a search request with the characteristics; and
   performing the find-more-like-this search by searching the systems management environment for additional one or more computing-based managed items that contain one or more of the characteristics but do now completely match the characteristics.

9. A method comprising:
   navigating among computing-based managed items which are part of a systems management environment to locate one or more computing-based managed items when requested, each of the one or more computing-based managed items located by a respective unique identifier;
   collecting the one or more selected computing-based managed items into a focus collection, wherein the focus collection is configured to:
   collect incrementally, based on a plurality of different navigations, the one or more selected computer-based managed items; and
   at least temporarily maintain all of the one or more selected computer-based items within the focus collection such that all of the one or more selected computer-based managed items in the focus collection are not lost during the plurality of different navigations through the systems management environment;
   receiving a request to construct a find-more-like-this search based on characteristics of the one or more computing-based managed items in the focus collection, the find-more-like-this search designed to locate additional computing-based managed items that share a common characteristic with the one or more computing-based managed items in the focus collection;
   constructing the find-more-like-this search, the constructing comprising:
   retrieving characteristics of the one or more computing-based managed items in the focus collection; and
   building a search request with the characteristics; and
   performing the find-more-like-this search by searching the systems management environment for additional one or more computing-based managed items that contain one or more of the characteristics but do now completely match the characteristics.

10. A method as recited in claim 9, wherein the navigating includes searching the systems management environment to locate the one or more computing-based managed items.

11. A method as recited in claim 9, wherein the navigating includes using a search expression to locate the one or more computing-based managed items, the method further comprising transferring the search expression into the focus collection, wherein the search expression is:
   a value or a combination of values that are different from the unique identifier; and
   at least temporarily maintained at the focus collection.

12. A method as recited in claim 9, wherein the navigating and the collecting are incrementally performed as the one or more computing-based managed items are sequentially located, the incrementally navigating comprising:
   progressively refining a search expression to locate the one or more computing-based managed items, the search expression being a value or a combination of values that are different from the unique identifier;
   searching the one or more computing-based items to locate the one or more computing-based items that satisfy the refined search expression, the one or more computing-based items being a first search result based on a search expression prior to the refining; and
   displaying a second search result based on the refined search expression.

13. A method as recited in claim 9, further comprising receiving a search request that includes at least one of: a search request entered via a graphical user interface (GUI); a search request entered via a command line interface (CLI); a search request entered via an application programming interface (API).

14. A method as recited in claim 9, wherein the focus collection is implemented using a common underlying service that allows the focus collection to be shared across graphical user interfaces (GUIs), command line interfaces (CLIs), and scripting systems.

15. One or more computer readable storage media comprising computer executable instructions that, when executed, causes one or more processors to perform actions comprising:
   index computing-based managed items which are part of a systems management environment that includes computer systems, software, networks and mobile devices, such that each of the computing-based managed items is associated with a respective unique identifier in an index, wherein:
   the indexing includes associating values that respectively describe each one of the computing-based managed items with field names that categorize the values by type; and
   one or more of the values are used as part of the search request;
   receive a search request to locate one or more of the computing-based managed items which have been indexed, the search request comprising at least one value that is not included in the index and at least one value that is included in the index;
   search the systems management environment to locate the one or more of the computing-based managed items based on the search request, wherein the searching to locate the one or more computing-based managed items is based on the at least one value that is included in the index; and
   collecting the one or more located computer-based managed items through a user selecting one or more unique identifiers into a focus collection, each of the one or more unique identifiers associating with the one or more located computer-based managed items, wherein the focus collection is configured to:
   collect incrementally, based on a plurality of different search requests, the selected one or more located computer-based items; and
   at least temporarily maintain all of the selected one or more computer-based items within the focus collection such that all of the selected one or more located computer-based managed items in the focus collection are not lost when the plurality of different search requests are conducted within the systems management environment.

16. One or more computer readable storage media as recited in claim 15, wherein the selected ones of the unique identifiers that are at least temporarily maintained in the focus collection are for a systems manager.

17. One or more computer readable storage media as recited in claim 15, wherein the actions further comprise:
   receiving additional search requests to progressively refine a previous search request;
   searching the one or more computing-based items to locate the one or more of the computing-based items that satisfy the additional search requests, wherein the one or more of the computing-based items are located as a search result based on the previous search request; and
   displaying search results which are progressively refined as each of the additional search requests are received.
   displaying search results which are progressively refined as each of the additional search requests are received.

18. One or more computer readable storage media as recited in claim 15, wherein the actions further comprise:
   displaying search results identifying the one or more computing-based managed items located by the search; and
   receiving a request to construct a find-more-like-this search based on characteristics of the displaying search results, the find-more-like-this search designed to locate additional computing-based managed items that share a common characteristic with the one or more computing-based managed items which have been identified;
   constructing a find-more-like-this search based on characteristics of the displayed search results; and
   performing the find-more-like-this search by searching the systems management environment for additional one or more computing-based managed items that contain one or more of the characteristics but do now completely match the characteristics.

19. One or more computer readable storage media comprising computer executable instructions that, when executed, configure one or more processors to perform the method as recited in claim 9.

* * * * *